Patented Nov. 4, 1952

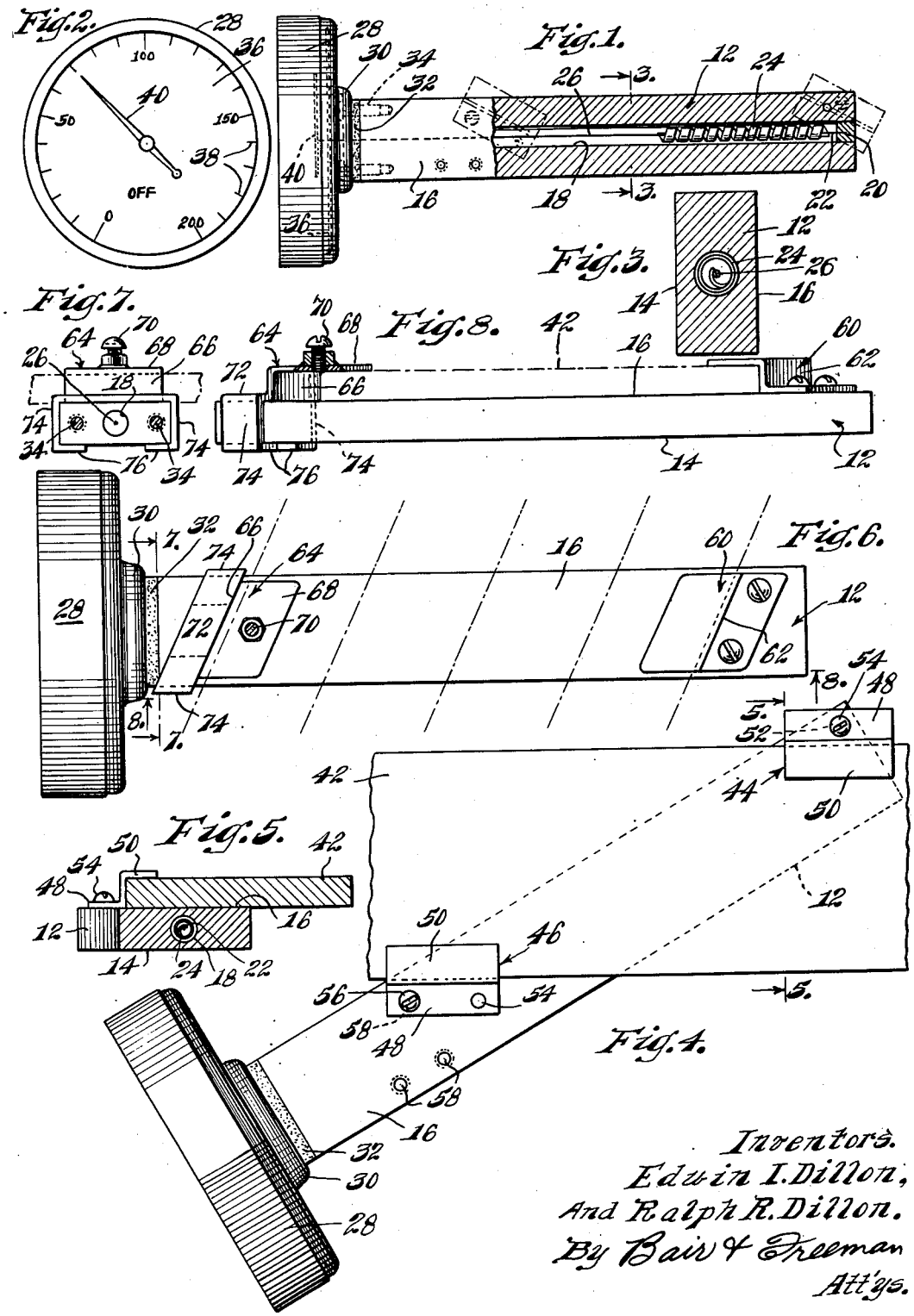

2,616,297

UNITED STATES PATENT OFFICE 2,616,297

THERMOMETER

Edwin I. Dillon and Ralph R. Dillon, Chicago, Ill., assignors to W. C. Dillon & Company Inc., Chicago, Ill., a corporation of Illinois Application December 22, 1947, Serial No. 793,280

3 Claims. (Cl. 73—343)

This invention relates to thermometers and particularly to the type adapted for surface contact with a solid body, the temperature of which is to be determined.

One of the uses to which a thermometer of the present invention is particularly adaptable is for determining the temperature of bus bars, which are increasingly used in factory and power plant installations instead of wire. The temperature of a bus bar varies according to the amperage load being conducted therethrough, and by determining the various temperatures of the bus bar, the various amperage loads thereof can be readily determined.

There are, of course, many other uses to which the thermometer of the present invention is applicable, the above instance being disclosed as being generally illustrative.

Previous types of thermometers as used in connection with bus bars are subject to various objections. Thermometers, as heretofore available, have round stems and are not adapted to engage a bus bar over any considerable area. Heretofore, in order to ensure surface contact with the object to be tested, putty was ordinarily used. The use of putty proved to be unsatisfactory in many respects.

Furthermore, putty dries after a period of time and, when dried, falls off or moves in mass so that good thermal contact is thereby lost. What is more serious is that the thermometer itself often becomes detached from the object to be tested, and falls and breaks. Therefore, in the use of previous types of thermometers, accurate readings of the bodies to be tested could not be obtained, and serious breakage losses occurred.

An object of the present invention is the provision of a novel type thermometer designed for overcoming the objections above noted.

Another object of the invention is the provision of a thermometer having a novel dual-purpose stem which contains the thermometer elements and is specially designed to contact an object to be tested.

Still another object of the invention is the provision of a thermometer having a contact surface of substantial area adapted to engage the surface of the body to be tested over a considerable area.

A still further object is the provision of a thermometer which can be applied and secured to an object to be tested with a maximum saving of time.

Another object is the provision of a thermometer having a novel stem and novel clamps or brackets for securing the thermometer to the object to be tested.

A further object is the provision of a thermometer having brackets or clamps as above referred to which are adjustable for securement to objects or bodies of any size within a considerable range.

A still further object is the provision of a thermometer having a stem of which at least one face is shaped to fit the contour of the body or object being tested.

Another object of the invention is the provision of a novel thermometer which can be readily secured to an object being tested in such a manner that the thermometer is positioned so as to be readily observed.

Another object of the invention is the provision of a novel thermometer which can be effectively secured to an object to be tested in such a manner as to prevent breakage.

A still further object of the present invention is the provision of a thermometer, which by reason of firm contact engagement with the object to be tested, is adapted for replacement of expensive thermocouples which have previously been used.

With these and other objects in view, our invention consists in the construction, arrangement, and combination of the various parts of our device whereby the objects contemplated are attained, as hereinafter more fully set forth, pointed out in our claims, and illustrated in the accompanying drawings, wherein:

Figure 1 is a top view of the thermometer of the present invention showing a portion of the stem thereof in longitudinal section;

Figure 2 is an end view from the left of Figure 1;

Figure 3 is an enlarged, sectional view taken on line 3—3 of Figure 1;

Figure 4 is a top view of an enlarged scale of the thermometer applied to a bus bar;

Figure 5 is a sectional view taken on line 5—5 of Figure 4;

Figure 6 is a top view of the thermometer, illustrating a modified form of clamping or securing means;

Figure 7 is a view taken on line 7—7 of Figure 6; and

Figure 8 is an edge view of the stem taken on line 8—8 of Figure 6.

Referring now in detail to the drawings, and particularly to Figures 1 to 5 thereof, the thermometer of the present invention includes an elongated stem 12 which, in the present instance, is of rectangular cross-section as illustrated in Figure 3. The stem 12 is thereby provided with opposite plane faces 14 and 16 which are of relatively large dimension transversely of the stem as compared with the remaining two faces. The stem 12 may be of any good heat-conducting material whether of metal or otherwise, and, when used in connection with bus bars is preferably made of copper. The particular metal, so long as it possesses good heat conductivity, does not form an essential part of the present invention.

The stem 12 is provided with a longitudinal axial bore 18 in the outer end of which is a plug 20 which may be press fitted into the bore for closing the outer end thereof. A short stub shaft 22 is secured to the inner surface of the plug 20 by means of welding or other desired method, and extends axially into the bore 18. A coiled, bimetallic, thermo-responsive element 24 is positioned in the bore 18 and has one end secured to the stub shaft 22 as by means of welding. The thermo-responsive element 24 may be a standard article, well known in the art, which rotates upon expansion and contraction thereof. The bore 18 need not be substantially greater in diameter than the diameter of the thermo-responsive element 24.

A longer shaft 26 is secured to the inner end of the thermo-responsive element 24, as by means of welding, and extends axially in the bore 18 and out of the bore at the opposite end of the stem 12. The shafts 22 and 26 in the present instance are of quite small diameter and are actually in the form of wires. It is understood, however, that the shaft 26 is of such characteristics as to transmit the torque from the thermo-responsive element 24.

At the opposite end of the thermometer is a dial housing 28 which may be a conventional housing having a glass closure face. The back surface of the dial housing 28 is provided with a central abutment 30 adapted to face the end of the stem 12. A gasket of good heat-insulating material 32, such as asbestos, is interposed between the abutment 30 and the stem: and the assembly, including the dial housing 28, insulating material 32, and stem 12, are secured together by means of screws 34 inserted through holes in the abutment 30 and insulating material 32 and into threaded holes in the facing end of the stem 12.

A dial 36 is provided in the dial housing 28 and secured therein in a conventional manner, as by means of screws, to the back face of the dial housing and is provided with dial markings 38 which are readily visible through the front closure glass of the dial housing. The free end of the shaft 26 extends through a central opening in the dial 36 and is mounted therein for rotation. An indicating pointer 40 is secured to the extended end of the shaft 26 by means of solder or the like and, on rotation of the shaft 26, cooperates with the scale markings 38 to indicate the temperature of the object or body being tested.

Thus, changes in temperature of the stem 12 which are transmitted to the thermo-responsive element 23 are registered by means of the indicating pointer 40 and dial 36.

One form of means for securing the thermometer to a body to be tested is illustrated in Figures 4 and 5. A bus bar is illustrated at 42. As is well known, most bus bars are flat objects having smooth, flat surfaces. The opposite plane faces 14 and 16 of the stem 12 in the present illustration are also relatively smooth and are adapted to engage the flat surfaces of the bus bar over a considerable area. Clamp or bracket means 44 and 46 are provided for securing the thermometer to the bus bar 42. Each of the clamps 44 and 46 is in the form roughly of a Z, in cross section or end view, having a portion 48 engageable with the face of the stem 12, and a portion 50 which is offset from the portion 48 a distance substantially equal to or slightly less than the thickness of the bus bar 42. In the case of the clamp 44, the portion 48 thereof is provided with a hole 52 for receiving a screw 54 which is threaded into a threaded hole in the stem 12. Similarly, in the case of the clamp 46 the portion 48 is provided with a pair of holes 54, one of which is adapted to receive a screw 56 which threads into any of a plurality of threaded holes 58 in the stem 12. The hole 52 is adjacent one corner of the stem 12 remote from the dial housing 28, and the holes 58 are disposed adjacent the dial housing and are spaced adjacent opposite edges of the stem for adjustment purposes.

As illustrated in Figures 4 and 5, the stem 12 may be applied to one surface and, as here illustrated, to the undersurface of the bus bar. Preferably, the thermometer is positioned at an angle with respect to the bus bar as illustrated in Figure 4, so that the dial will be disposed outwardly from the bus bar toward an observer in a position for convenient reading. In such an arrangement, the thermometer stem will be disposed along the bus bar in a direction generally longitudinally of the latter so as to provide a maximum area of contact engagement between the stem and the bus bar.

The holes 52 and 58 are so positioned that when the thermometer is disposed as illustrated in Figure 4, the clamps 44 and 46 are adapted to engage the side edges and the top surface of the bus bar 42; screws 54 and 56 when tightened down secure the clamps in place and clamp the thermometer firmly to the bus bar.

If desired, the clamp 46 may be secured in others of the holes 58 to provide for adjustment of the thermometer to accommodate different widths of bus bars, and for positioning the thermometer at different angles with respect to the bus bars. It is also contemplated that the clamps 44 and 46 may be provided with slots for adjustably securing them in place. Furthermore, bus bars of different thicknesses can be accommodated, by spacing the clamps 44 and 46 from the face of the stem of the thermometer by using suitable spacer elements or by using spacer elements between the bus bar and the offset portion 50 of the clamps.

It will be seen that by forming the stem 12 with plane faces 14 and 16 of considerable area that good heat-conducting engagement is accomplished between the stem and the bus bar and the thermometer is firmly secured in position thereon. By virtue of this arrangement, the crude, unsatisfactory method of securing the thermometer in place by putty, with all of its attendant disadvantages may now be eliminated. Moreover, the present arrangement supplants the use of a thermocouple for purposes of testing current variations.

Figures 6, 7, and 8 illustrate a different type of clamp means for securing the thermometer to the bus bar. In this instance, the stem 12 is provided at its outer end with a clamp 60 which is of Z shape similarly to the clamps 44 and 46.

However, the clamp 60 is in the shape of a non-rectangular parallelogram, as viewed in plan, having a vertical portion 62 which is disposed at an angle with respect to the length of the stem 12, as clearly illustrated in Figure 6.

Another clamp 64, which is also of Z shape, is provided with vertical portion 66. The clamp 64 as viewed in plan is also a non-rectangular parallelogram, whereby the vertical portion 66 is disposed at an angle with respect to the stem 12 and parallel to the portion 62. The upper horizontal offset portion 68 of the clamp 64 is provided with a threaded hole for receiving a screw 70. The lower portion 72 of the clamp 64 is provided with lugs 74 which are turned down and engage the opposite side edges of the stem and, at the bottom of the lugs 74, are turned-in portions 76 engaging the lower face of the stem. When the thermometer employing the clamps as illustrated in Figures 6, 7, and 8 is applied to a bus bar, the parallel side edges of the bus bar are engaged by and between the vertical portions 62 and 66 of the clamps, which thereby disposes the thermometer at an angle with respect to the bus bar. The screw 70 is turned down to engage the bus bar which effectively secures the thermometer to the bus bar. While not shown, the stem may be provided with a series of threaded holes for the screws of the clamps, so as to permit positioning therealong to readily accommodate bus bars of different widths.

Some changes may be made in the construction and arrangement of the parts of our device without departing from the real spirit and purpose of our invention, and it is our intention to cover by our claims such modified forms of structure or use of mechanical equivalents as may be reasonably included within their scope.

We claim as our invention:

1. A thermometer adapted for mounting on a bus bar and the like, comprising, an elongated stem of high heat conducting material, said stem being unitary and having a longitudinal opening therein, said stem having a cross-sectional area which is large relative to the cross-sectional area of the opening, said stem having at least one flat face of substantial area adapted to engage the flat face of the bus bar in a position at an angle to the bus bar and across the entire width of the bus bar, a temperature responsive element operably mounted in said opening and operably connected with a temperature indicator, said temperature indicator being secured to said stem and laterally spaced from said bus bar, clamp means pivotally mounted on the end of said stem remote from said indicator, and second clamp means pivotally mounted on said stem adjacent said indicator, said clamp means being engageable with the edges of the bus bar for clamping the stem in firm engagement with the flat face of the bus bar, said second clamp means being adjustably movable to different positions on said stem for accommodating various widths of bus bars and different angles of the stem with respect to the bus bar.

2. A device for measuring and indicating the temperature of flat rectangular bus bars, said device comprising a thermometer having an elongated stem of high heat conducting material, the length of said stem being greater than the width of each bus bar, one side of said stem being flat and adapted to lie against said flat bus bar across the entire width thereof, a thermo-responsive element in said stem, a temperature indicator actuated by said thermo-responsive element and secured to said stem at a point laterally spaced from said bus bar, and means for clamping the flat face of the stem against the flat face of the bus bar including a pair of clamping elements on said stem having portions spaced from the flat face of the stem to provide recesses for reception of the bus bar, said clamping elements having opposed faces adapted to be variably spaced from each other to accommodate bus bars of various widths.

3. In combination, a device for measuring and indicating the temperature of flat rectangular bus bars, which device includes a thermometer having an elongated stem of high heat conducting material, the length of said stem being greater than the width of each bus bar, one side of said stem being flat and adapted to lie against said flat bus bar across the width thereof; and means for clamping the flat face of the stem against the flat face of the bus bar including a pair of clamping elements on said stem having portions spaced from the flat face of the stem to provide recesses for reception of the bus bar therein, said clamping elements having opposed parallel faces adapted to be variably spaced from each other to accommodate bus bars of various widths.

EDWIN I. DILLON.
RALPH R. DILLON.

REFERENCES CITED

The following references are of record in the file of this patent:

UNITED STATES PATENTS

| Number | Name | Date |
|---|---|---|
| 1,570,602 | Hobbs | Jan. 19, 1926 |
| 1,692,301 | Heslewood | Nov. 20, 1928 |
| 2,265,733 | Jones | Dec. 9, 1941 |
| 2,293,276 | Brown et al. | Aug. 18, 1942 |